No. 719,913. PATENTED FEB. 3, 1903.
G. L. WACKEROW.
STRAINER.
APPLICATION FILED AUG. 1, 1902.
NO MODEL.
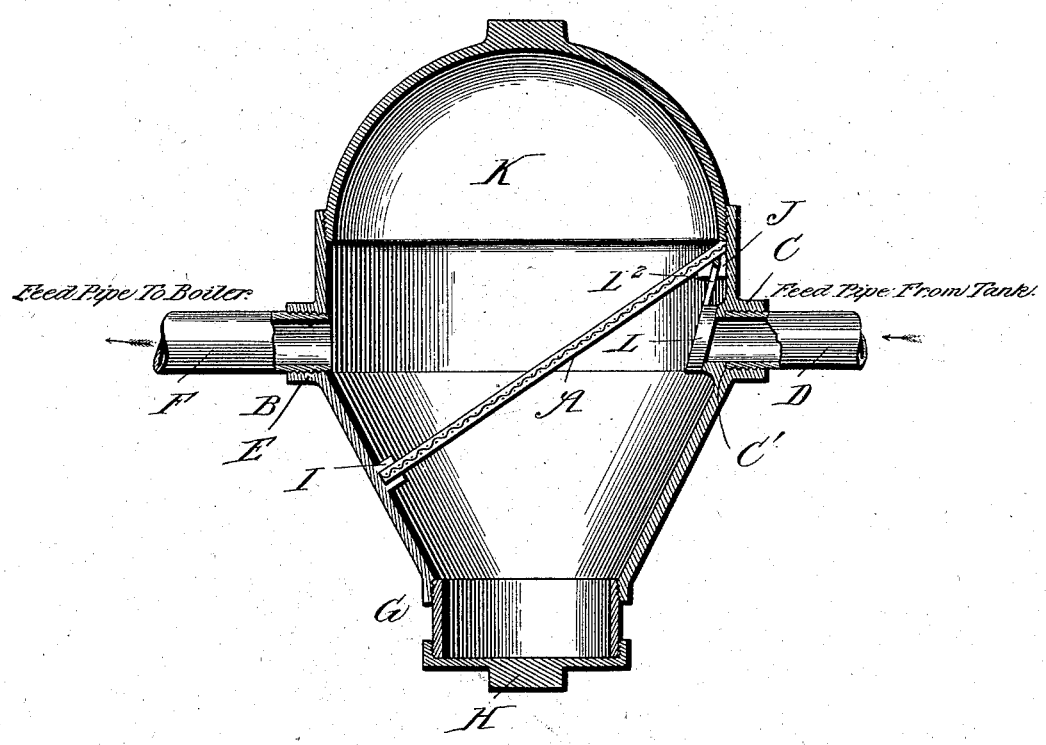
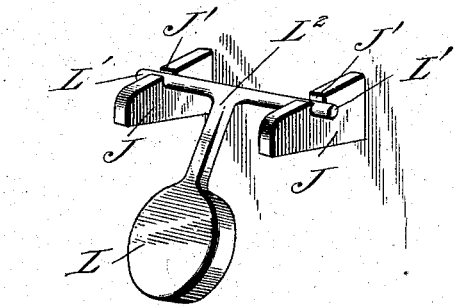
WITNESSES:
INVENTOR
George L. Wackerow.
BY
ATTORNEYS.

UNITED STATES PATENT OFFICE.

GEORGE LESLIE WACKEROW, OF MELLETTE, SOUTH DAKOTA, ASSIGNOR OF ONE-HALF TO FRED G. STICKLES, VALENTINE M. MILLER, CHARLES H. BRUNN, AND GEORGE M. RANDALL, OF MELLETTE, SOUTH DAKOTA.

STRAINER.

SPECIFICATION forming part of Letters Patent No. 719,913, dated February 3, 1903.

Application filed August 1, 1902. Serial No. 117,998. (No model.)

*To all whom it may concern:*

Be it known that I, GEORGE LESLIE WACKEROW, a citizen of the United States, and a resident of Mellette, in the county of Spink and State of South Dakota, have made certain new and useful Improvements in Strainers, of which the following is a specification.

My invention is an improvement in automatic strainers intended especially for use on water-supply pipes of steam-boilers, pumps, &c., but which may be used wherever it is desired to strain sediment or other substances out of water; and the invention consists in certain novel constructions and combinations of parts, as will be hereinafter described and claimed.

In the drawings, Figure 1 is a sectional elevation of the strainer embodying my invention, and Fig. 2 is a detail view of the check-valve.

My invention involves a strainer arranged in the path of the water and preferably at an angle thereto, and the strainer proper, A, is arranged within the casing-chamber B, which has at one end a nipple C for the connection of the feed-pipe D, leading from the tank, and at its other end a nipple E for the connection of the feed-pipe F, which leads from the chamber B to the boiler, pump, or other discharge-point. The chamber B is provided with a dropped portion or tube G, whose lower end is covered by a screw-cap H, which can be conveniently removed whenever it is desired to clean out the sediment-chamber. In the body of the chamber B, I provide at I lugs spaced apart and providing between them a seat for the lower edge of the strainer A, which strainer is arranged diagonally to the direction of the pipes D and F and rests at its upper end upon lugs J, against which it is held by the cap K, which screws into the upper open end of the chamber B. It will be noticed the upper end of the chamber B is entirely open, permitting convenient access to the strainer or screen A whenever the cap K is removed and also facilitating the insertion and removal of the strainer or screen A whenever desired. It will also be noticed that the cap K when turned home to the position shown in the drawings bears against the upper edge of the screen A and presses the same firmly against the rest-lugs J, provided in the casing B adjacent to the nipple C. A check-valve L controls the connection between the feed-pipe D and the casing B and prevents any return-flow of the fluid from the said chamber back through the pipe D.

The lugs or flanges J are spaced apart and provide at their upper edges the rest or seat for the upper edge of the strainer A. In these edges I also provide at J' notches in which journal the trunnions L' of the T-shank L² of the check-valve L. (See Fig. 2.) By this means the check-valve is journaled to the lugs against which the strainer rests and is held in engagement with said lugs by the strainer when the parts are applied as shown in Fig. 1.

The valve L seats against an inwardly-projecting extension C' of the nipple C, as best shown in Fig. 1 of the drawings.

In the operation of the invention it will be noticed that sediment or other impurities in the water supplied from the tank or other source will pass into the strainer-casing B, opening the valve L, and the impurities will be stopped by the strainer A and deposited in the sediment-receiver or dropped portion G of the casing, the strained water passing through the discharge-pipe F to the boiler, pump, or other discharge-point. Whenever desired, the cap H can be removed from the lower end of the strainer-casing and the sediment removed, and by removing the cap K access can be conveniently had to the strainer A, which can be removed and replaced, if desired, and the removal of the cap K opens up the interior of the strainer-casing for cleansing or other purposes.

In operation the water deflecting from the valve at an angle with the strainer will cause all dirt, &c., to be washed off the strainer, thus keeping the latter clean at all times.

Having thus described my invention, what I claim as new, and desire to secure by Letters Patent, is—

1. The combination substantially as herein described of the strainer-casing open at its upper end, a seat in said casing for the upper end of the strainer proper, a seat in the casing diagonally opposite said upper seat for the lower edge of the screen, the opposite nipples for connection of the feed and discharge pipes, a check-valve controlling the connection of the feed-pipe, the dropped portion or sediment-receiver, a cap therefor, the strainer arranged in the casing, held at its lower end in the seat therefor and bearing at its upper end against the seat in the casing, and the screw-cap threaded to the upper end of the casing and operating within the same and bearing upon the upper edge of the strainer and pressing the same against its rest-flange substantially as and for the purposes set forth.

2. The combination substantially as herein described of the casing open at its upper end, seats below said end for the upper and lower ends of the screen, the screen resting on said seats, and the screw-cap threaded in the upper end of the casing and bearing against the upper end of the screen, the casing being provided with means for the connection of the feed and discharge pipes and with the sediment-receiver below the screen substantially as set forth.

3. The combination substantially as described of the casing, a pipe connection, a valve-seat at the inner end thereof, inwardly-projecting lugs within the casing above the valve-seat and spaced apart and notched in their upper edges to form bearings for the trunnions of the check-valve, the check-valve fitted to said seat, the valve-trunnions bearing in the notches of the lugs or flanges, and the strainer proper held against the upper edges of said lugs and over the notches and trunnions therein substantially as and for the purposes set forth.

4. The combination with the casing provided with the inlet, the lugs in the casing above the inlet and spaced apart and provided in their upper edges with notches for the trunnions of the check-valve, the valve having its trunnions in said notches, the screen fitting against said lugs and over the notches and trunnions therein, and means for securing the screen substantially as set forth.

5. The combination of the strainer or screen, the casing having a seat for the lower edge thereof and a seat for the upper end of the screen and the screw-cap bearing upon the upper end of the screen and pressing same against its seat substantially as set forth.

6. The combination of the casing open at its upper end, the lugs I spaced apart to form a seat for the screen, the seat diagonally opposite said lugs and forming a bearing for the upper end of the screen, the screen fitting at its lower edge between said lugs and at its upper end upon the seat, and the screw-cap threaded in the casing and pressing the screen against the rest-flange substantially as set forth.

GEORGE LESLIE WACKEROW.

Witnesses:
CHAS. W. RICHARDSON,
JOHN DELAY.